(12) United States Patent
Qin et al.

(10) Patent No.: US 11,460,601 B1
(45) Date of Patent: Oct. 4, 2022

(54) METHOD FOR DETERMINING DISTRIBUTION OF URANIUM DEPOSIT

(71) Applicant: BEIJING RESEARCH INSTITUTE OF URANIUM GEOLOGY, Beijing (CN)

(72) Inventors: Mingkuan Qin, Beijing (CN); Qiang Guo, Beijing (CN); Bihong Li, Beijing (CN); Licheng Jia, Beijing (CN); Shaohua Huang, Beijing (CN); Jing Xiao, Beijing (CN)

(73) Assignee: BEIJING RESEARCH INSTITUTE OF URANIUM GEOLOGY, Beijing (CN)

( * ) Notice: Subject to any disclaimer, the term of this patent is extended or adjusted under 35 U.S.C. 154(b) by 0 days.

(21) Appl. No.: 17/689,128

(22) Filed: Mar. 8, 2022

(30) Foreign Application Priority Data

Oct. 26, 2021 (CN) .......................... 202111249748.1

(51) Int. Cl.
*G01V 3/38* (2006.01)
*G01V 5/02* (2006.01)
*G01V 5/06* (2006.01)
*G01V 3/16* (2006.01)
*G01V 11/00* (2006.01)
*G01V 9/00* (2006.01)

(52) U.S. Cl.
CPC .................. *G01V 3/38* (2013.01); *G01V 3/16* (2013.01); *G01V 5/02* (2013.01); *G01V 5/06* (2013.01); *G01V 9/007* (2013.01); *G01V 11/00* (2013.01)

(58) Field of Classification Search
CPC ... G01V 3/38; G01V 3/16; G01V 5/02; G01V 5/06; G01V 9/007; G01V 11/00
See application file for complete search history.

(56) References Cited

U.S. PATENT DOCUMENTS

2016/0047939 A1    2/2016  Mumelter

FOREIGN PATENT DOCUMENTS

| CN | 101882274 A |   | 11/2010 |
|----|-------------|---|---------|
| CN | 103903061 A |   | 7/2014  |
| CN | 104076393 A | * | 10/2014 |
| CN | 104076393 A |   | 10/2014 |
| CN | 105549113 A | * | 5/2016  |
| CN | 108107481 A |   | 6/2018  |

(Continued)

OTHER PUBLICATIONS

Decision to Grant for Chinese Patent Application No. 202111249748.1, dated Jan. 18, 2022, 5 pages.

(Continued)

*Primary Examiner* — Toan M Le
*Assistant Examiner* — Xiuqin Sun
(74) *Attorney, Agent, or Firm* — Westman, Champlin & Koehler, P.A.

(57) ABSTRACT

A method for determining a distribution of a uranium deposit is provided, including: acquiring a remote detection result of a target area; acquiring a chemical detection result of soil in the target area; delineating a plurality of exploration regions in the target area according to the remote detection result and the chemical detection result; and providing boreholes in the plurality of exploration regions for gamma detection to determine a distribution and a trend of a uranium deposit according to a result of the gamma detection.

13 Claims, 4 Drawing Sheets

(56) References Cited

FOREIGN PATENT DOCUMENTS

| | | | | |
|---|---|---|---|---|
| CN | 108680965 A | | 10/2018 | |
| CN | 109324355 A | * | 2/2019 | ............. G01V 11/00 |
| CN | 109828316 A | | 5/2019 | |
| WO | 2014177180 A1 | | 11/2014 | |

OTHER PUBLICATIONS

First Office Action for Chinese Patent Application No. 202111249748.1, dated Dec. 7, 2021, 17 pages.
Second Office Action for Chinese Patent Application No. 202111249748.1, dated Jan. 4, 2022, 11 pages.

* cited by examiner

METHOD FOR DETERMINING DISTRIBUTION OF URANIUM DEPOSIT

CROSS-REFERENCE TO RELATED APPLICATION

This application claims priority to Chinese Patent Application No. 202111249748.1, filed on Oct. 26, 2021, the content of which is incorporated herein by reference in its entirety.

TECHNICAL FIELD

The present disclosure relates to a field of testing or analyzing a material by measuring chemical or physical properties of the material, in particular to a method for determining a distribution of a uranium deposit.

BACKGROUND

Sandstone-type uranium deposits are usually distributed in deep parts of sedimentary basins. In recent years, major breakthroughs have been made in the exploration of sandstone-type uranium deposits in sedimentary basins in China, and super-large uranium deposits such as the Daying uranium deposit have been discovered. However, there is a lack of a relatively effective exploration method for determining a distribution and a trend of a uranium deposit deep in a sedimentary basin, resulting in a high risk of site selection for uranium deposit engineering drilling.

SUMMARY

In view of the above problems, the present disclosure is proposed to provide a method for determining a distribution of a uranium deposit, so as to overcome, or at least partially solve the above problems.

According to an embodiment of the present disclosure, a method for determining a distribution of a uranium deposit is provided, including: acquiring a remote detection result of a target area, where the remote detection result includes at least one of a remote sensing detection result, an airborne radioactivity survey result, and an aeromagnetic survey result; acquiring a chemical detection result of soil in the target area, where the chemical detection result includes at least one of a measurement result of soil radon gas, a measurement result of mobile forms of soil elements, and a measurement result of geogas; delineating a plurality of exploration regions in the target area according to the remote detection result and the chemical detection result; and providing boreholes in the plurality of exploration regions for gamma detection to determine a distribution of a uranium deposit and a trend of the uranium deposit according to a result of the gamma detection.

The method for determining a distribution of a uranium deposit according to the embodiments of the present disclosure may select an exploration region by combining the remote detection result with the ground chemical detection result, and provide boreholes in the exploration area, so that the distribution and the trend of the uranium deposit may be determined more effectively and accurately.

DETAILED DESCRIPTION OF EMBODIMENTS

In order to make the objectives, technical solutions and advantages of the present disclosure more clear, the technical solutions of the present disclosure are clearly and completely described below with reference to the drawings of the embodiments of the present disclosure. However, the described embodiments are only a part but not all of the embodiments of the present disclosure. Based on the embodiments of the present disclosure, all other embodiments obtained by those of ordinary skilled in the art without carrying out creative work fall within the scope of protection of the present disclosure.

It should be noted that unless otherwise defined, technical terms or scientific terms used in the present disclosure shall be of the general meanings understood by those of ordinary skilled in the art. Terms such as "first" and "second" involved in the present disclosure are only used to distinguish similar objects, and should not be construed as indicating or implying their relative importance or order, or implicitly indicating the number of the indicated technical features. It should be understood that the data described by "first", "second", etc. may be interchanged under appropriate circumstances. The expression "and/or" in the present disclosure means that three parallel solutions may be included. Taking "A and/or B" as an example, it includes solution A alone, solution B alone, or both the solution A and the solution B.

Figure 1:
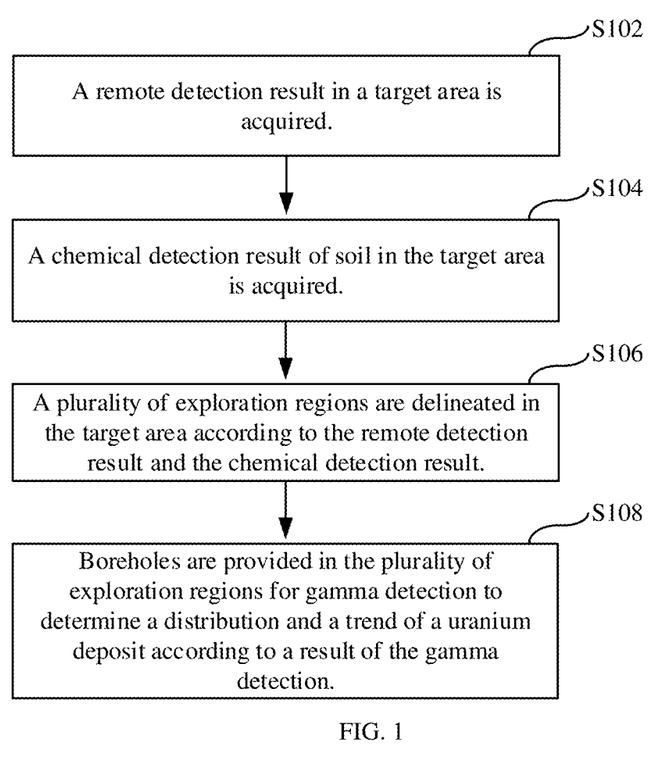
FIG. 1 shows a flowchart of a method for determining a distribution of a uranium deposit according to an embodiment of the present disclosure.

A method for determining a distribution of a uranium deposit is provided according to an embodiment of the present disclosure. Referring to FIG. 1, the method includes the following steps.

In step S102, a remote detection result of a target area is acquired, where the remote detection result may include at least one of: a remote sensing detection result, an airborne radioactivity survey result and an aeromagnetic survey result.

In step S104, a chemical detection result of soil in the target area is acquired, where the chemical detection result may include at least one of a measurement result of soil radon gas, a measurement result of mobile forms of soil elements, and a measurement result of geogas.

In step S106, a plurality of exploration regions are delineated in the target area according to the remote detection result and the chemical detection result.

In step S108, boreholes are provided in the plurality of exploration regions for gamma detection, to determine a distribution of a uranium deposit and a trend of the uranium deposit according to a result of the gamma detection.

The target area may be an area with possibility of a distribution of a uranium deposit determined according to geological data, etc. In some embodiments, the target area may be an area which is not smaller than 100 km*100 km in a sedimentary basin and is determined according to geological data. However, it may be understood that the target area may also be any area where those skilled in the art wish to conduct an exploration of uranium deposition, which is not specifically limited in the embodiments of the present disclosure.

In step S102, the remote detection result of the target area is acquired, where the remote detection result may include at least one of the remote sensing detection result, the airborne radioactivity survey result, and the aeromagnetic survey result. Those skilled in the art may select one or more items for detection according to an actual situation. It may be understood that selecting more detection items is conducive to delineating the exploration regions accurately and improving the efficiency and accuracy of subsequent work.

In some embodiments, data related to the distribution of the uranium deposit may be brought into particular focus when conducting the above remote detection items (e.g., when conducting a field detection), and/or when collecting the detection results (e.g., when analyzing the results). For example, abnormal hydroxyl data and abnormal iron staining data are brought into particular focus when acquiring the remote sensing detection result, and date such as a uranium content, a uranium-to-thorium ratio, a uranium-to-potassium ratio, and a uranium variable coefficient may be brought into particular focus when acquiring the airborne radioactivity survey result.

In step S104, the chemical detection result of the soil in the target area is acquired, where the chemical detection result may include at least one of the measurement result of soil radon gas, the measurement result of mobile forms of soil elements, and the measurement result of geogas. Similar to step S102, those skilled in the art may select one or more items for detection according to an actual situation, which will not be described here in detail.

In some embodiments, data related to the distribution of the uranium deposit may be brought into particular focus when conducting the above chemical detection items, and/or when collecting the detection results. For example, contents of elements such as Th, Mo, Se, Re, V of mobile forms, and correlation coefficients with the uranium content may be brought into particular focus when acquiring the measurement result of mobile forms of soil elements. The contents of Th, Mo, Se, Re, and V in the geogas, and the correlation coefficients with the uranium content may be brought into particular focus when acquiring the measurement result of geogas.

In step S106, the plurality of exploration regions may be determined according to the remote detection result and the chemical detection result. As described above, the remote detection result and the chemical detection result include various data related to the distribution of the uranium deposit. According to these data, those skilled in the art may delineate a plurality of exploration regions where a distribution of a uranium deposit is most likely to exist in the target area. Some specific methods for delineating the exploration regions will be described in related parts below, which will not be described in detail here. Further, in step S108, boreholes may be provided in these exploration regions for gamma detection (also referred to as gamma logging), so as to determine the distribution of the uranium deposit and the trend of the uranium deposit.

The method for determining a distribution of a uranium deposit according to the embodiments of the present disclosure combines the remote detection result in the air with the chemical detection result on the ground to delineate the exploration regions in the target area, and further provides boreholes in the exploration regions for gamma detection, so that the distribution of the uranium deposit and the trend of the uranium deposit may be determined more effectively and accurately.

In some embodiments, in step S106, delineating the plurality of exploration regions in the target area according to the remote detection result and the chemical detection result may specifically include: generating a plurality of grid map layers of the target area in a same scale; assigning values to grids in the grid map layers according to the remote detection result and the chemical detection result, respectively, where a detection result of each type corresponds to one grid map layer, and when the remote detection result or the chemical detection result indicates a distribution of a uranium deposit in a grid, a relatively great value is assigned to the grid; adding values of corresponding grids in the plurality of grid map layers to form a combined map layer; and delineating the plurality of exploration regions according to values of the combined map layer, where the exploration regions are areas with relatively great values in the combined map layer.

Figure 2:
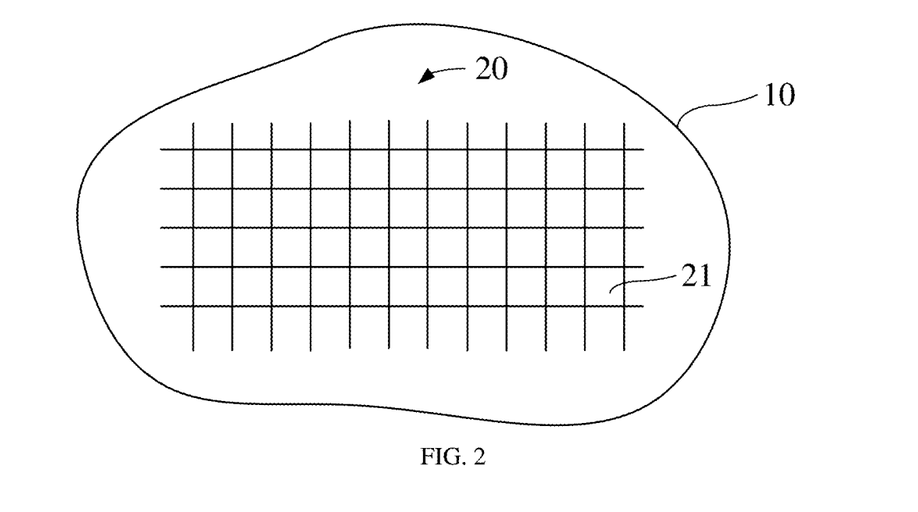
FIG. 2 shows a schematic diagram of a grid map layer according to an embodiment of the present disclosure.

FIG. 2 shows a schematic diagram of a grid map layer in the target area (where what shown in FIG. 2 is not a whole picture of the grid map layer 20). The grid map layer 20 may be formed by dividing a target area 10 with grids and scaling to a certain scale. For example, a grid 21 in the grid map layer 20 may represent a parcel of 200 m*200 m in the target area 10, so that a gridding treatment for the target area 10 is completed, which is beneficial to the subsequent statistics and analysis on the remote detection result and the chemical detection result. Those skilled in the art may set the scaling scale according to actual requirements, and a shape of the grid is not limited to a square, for example, the grid may also be a rectangular grid of 100 m*200 m or a grid of another shape, which is not specifically limited here.

In the embodiment, a plurality of grid map layers 20 of the same scale may be generated, and then values are assigned to grids 21 in the grid map layers 20 according to the remote detection result and the chemical detection result, respectively. During the value assignment, one type of detection result corresponds to one grid map layer 20. For example, when the remote detection result includes the remote sensing detection result, the airborne radioactivity survey result, and the aeromagnetic survey result at the same time, the three types of detection results respectively correspond to different grid map layers 20. That is, a value is assigned to a grid map layer 20 according to the remote sensing detection result, a value is assigned to another grid map layer 20 according to the airborne radioactivity survey result, and a value is assigned to yet another grid map layer 20 according to the aeromagnetic survey result.

In some embodiments, a detection result of a certain type may further include detection result data of various types. For example, as described above, the remote sensing detection result may include abnormal hydroxyl data and abnormal iron staining data. At this time, they may also respectively correspond to different grid map layers 20, so that the data type in each grid map layer 20 is relatively single, making it easier to determine a value assignment rule. Of course, those skilled in the art may also choose to regard the abnormal hydroxyl data and the abnormal iron staining data as the same type of detection results, and combine both data to assign values to a grid map layer 20. This will make the value assignment rule more complex and the influence of various data needs to be considered at the same time, however, it will also effectively reduce the number of the grid map layers 20 to which values need to be assigned.

Further, during value assignment to the grids 21 in the grid map layers 20, when the remote detection result or the chemical detection indicates there is a distribution of a uranium deposit in a grid 21, a relatively great value is assigned to the grid 21. As described above, a grid 21 in the grid map layers 20 corresponds to a parcel in the target area 10, and the remote detection result or the chemical detection result at the grid 21 refers to the detection result of the parcel in the target area 10. If the detection result indicates there is a distribution of a uranium deposit, a relatively great value is assigned to such grid. Those skilled in the art may determine a value assignment rule according to an actual situation. For example, the value assignment rule may be determined according to a specific value of the detection result and the importance of the detection result as a uranium distribution index, as long as it may be ensured that the greater the value, the higher the probability that a uranium deposit is distributed in the parcel. Some specific value assignment rules will be described in related parts below, which will not be described in detail here.

In an actual application process, for some types of data, such as the remote sensing detection result, the airborne radioactivity survey result, and the aeromagnetic survey result, steps of generating the grid map layers 20 and assigning values to the grids 21 may be completed at the same time directly through a gridding treatment. Those skilled in the art may perform data processing according to an actual situation, which is not specifically limited here.

Figure 3:
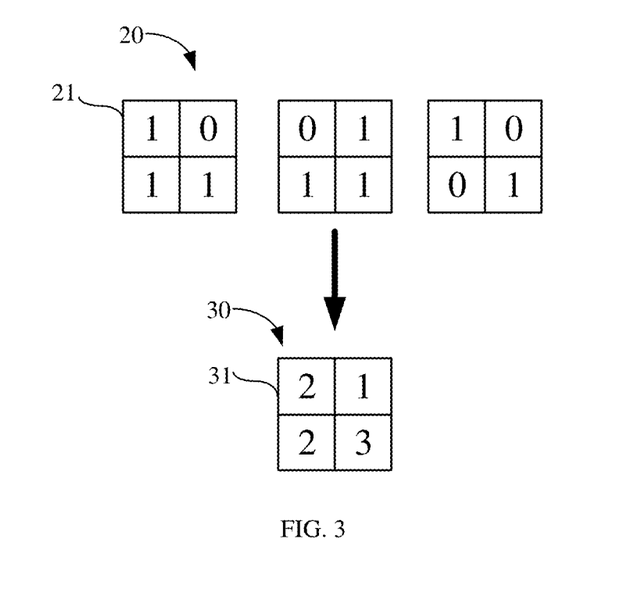
FIG. 3 shows a schematic diagram of a principle of synthesizing a combined map layer from a plurality of grid map layers according to an embodiment of the present disclosure.

Referring to FIG. 3, after value assignment of all the grid map layers 20 is completed, the values of corresponding grids 21 in the plurality of grid map layers 20 may be added to form a combined map layer 30. In the embodiment shown in FIG. 3, values of corresponding grids 21 in each grid map layer 20 are directly added, and a result is filled in a grid 31 at a corresponding position in the combined map layer 30. It should be noted that FIG. 3 only shows an exemplary schematic diagram of adding values of three grid map layers 20, while in the actual working process, values of all grid map layers 20 need to be added. In some other embodiments, when values in each grid map layer 20 are added, different weights may be assigned to different grid map layers 20 according to the importance of a detection result corresponding to a grid map layer 20 as a uranium distribution index, and the values may be added according to these weights. In some embodiments, values in the combined map layer 30 may be represented by different colors. For example, the values in different sections may be given different colors. In this way, a distribution of values in the combined map layer 30 may be understood more intuitively, so as to delineate the exploration regions in the combined map layer 30.

It may be understood that the combined map layer 30 fuses the data in the grid map layers 20. Since the values in the grid map layers 20 reflect a probability that a uranium deposit is distributed, in the grid 31 of the combined map layer 30 acquired by adding the values in the grid map layers 20, the greater the value, the higher the probability that a uranium deposit is distributed. Those skilled in the art may select an area with a relatively great value in the combined map layer 30 as an exploration region for subsequent drilling and gamma detection.

In the above embodiment, the remote detection result and the chemical detection result are represented in numerical form by means of grid map layers, and these detection results are fused, so that the detection results may be determined and interpreted more conveniently, and the exploration regions may be delineated according to the detection results. In some other embodiments, those skilled in the art may also choose data processing of other forms on the remote detection result and the chemical detection result (for example, the detection results are formed in a form of image such as isograms, heat maps, etc.), and then analyze the processed data to delineate the exploration regions in the target area, which will not be described in detail here.

In some specific embodiments, specific value assignment rules used when values are assigned to the grid map layers 20 according to the detection results will be described below. In the value assignment rules described below, when a result indicates there is a distribution of a uranium deposit, a value of 1 is assigned, while when a result does not indicate there is a distribution of a uranium deposit, a value of 0 is assigned. However, in some other embodiments, a more refined value assignment rule may be set. For example, a value between 0 and 5 is assigned according to a specific detection result. The higher the probability that a uranium deposit is distributed, the larger the value. In some embodiments, a specific value assigned may be a value in any suitable value range, and is not limited to 0 or 1. All improvements made by those skilled in the art on the basis of the value assignment rules described below according to an actual situation fall within the scope of the present disclosure.

As described above, in some embodiments, values may be assigned to the grids 21 in the grid map layers 20 according to the remote sensing detection result, the airborne radioactivity survey result, and the aeromagnetic survey result, respectively.

In some embodiments, when values are assigned to the grids 21 in the grid map layers 20 according to the remote sensing detection result, abnormal hydroxyl data and/or abnormal iron staining data of the target area 10 may be first determined according to the remote sensing detection result, and then values may be assigned to the grids in the grid map layers according to the abnormal hydroxyl data and the abnormal iron staining data, respectively. Exemplarily, a grid map layer 20 corresponding to the abnormal hydroxyl data may be called RH1, and a grid map layer 20 corresponding to the abnormal iron staining data may be called RF1. If there is a hydroxyl abnormality in a parcel corresponding to a certain grid 21 in RH1, the grid 21 is assigned a value of 1, and if there is no hydroxyl abnormality, the grid 21 is assigned a value of 0. If there is an iron staining abnormality in a parcel corresponding to a certain grid 21 in RF1, the grid 21 is assigned a value of 1, and if there is no iron staining abnormality, the grid 21 is assigned a value of 0. Those skilled in the art may use the judgment criteria commonly used in the art or set a judgment criteria by themselves according to an actual situation to judge whether there is a hydroxyl abnormality or an iron staining abnormality, which will not be described in detail here.

In some embodiments, assigning values to the grids 21 in the grid map layers 20 according to the airborne radioactivity survey result includes: according to the airborne radioactivity survey result, determining at least one of: uranium content data, uranium-thorium ratios, uranium-potassium ratios, and uranium variable coefficients; and assigning values to the grids 21 in the grid map layers 20 according to the uranium content data, the uranium-thorium ratios, the uranium-potassium ratios, and the uranium variable coefficients, respectively, where abnormal thresholds corresponding to the uranium content data, the uranium-thorium ratios, the uranium-potassium ratios, and the uranium variable coefficients are respectively determined, a grid with uranium content data, a uranium-thorium ratio, a uranium-potassium ratio, and a uranium variable coefficient greater than corresponding abnormal thresholds is assigned a value of 1, and a grid, with uranium content data, a uranium-thorium ratio, a uranium-potassium ratio, and a uranium variable coefficient smaller than the corresponding abnormal thresholds is assigned a value of 0.

Exemplarily, a grid map layer 20 corresponding to the uranium content data may be called HFU, a grip map layer 20 corresponding to the uranium-thorium ratios may be called HFUT, a grid map layer 20 corresponding to the uranium-potassium ratios may be called HFUK, and a grid map layer 20 corresponding to the uranium variable coefficients may be called HFVC. Taking HFU as an example, during value assignment, the acquired uranium content data may be statistically analyzed to determine an abnormal threshold. For example, a result acquired by adding 1.5 times of mean square error to an average of all the acquired uranium content data may be used as the abnormal threshold, if uranium content data of a parcel corresponding to a grid 21 is greater than the abnormal threshold, a value of 1 is assigned, and the uranium content data is smaller than the abnormal threshold, a value of 0 is assigned. Similarly, for other grid map layers 20, corresponding abnormal thresholds may also be calculated, and values may be assigned according to the above rules.

In some embodiments, when values are assigned to the grids 21 in the grid map layers 20 according to the aeromagnetic survey result, aeromagnetic reduction-to-pole data may be acquired first according to the aeromagnetic survey result, and then values may be assigned according to specific values of the aeromagnetic reduction-to-pole data. Those skilled in the art may use methods commonly used in the art to acquire the aeromagnetic reduction-to-pole data, which will not be described in detail here. Exemplarily, a grid map layer 20 corresponding to the aeromagnetic survey result may be called HM1, when aeromagnetic reduction-to-pole data in a parcel corresponding to a grid 21 is greater than or equal to −100 nT, and smaller than or equal to 100 nT, a value of 1 is assigned, and when the aeromagnetic reduction-to-pole data is smaller than −100 nT or greater than 100 nT, a value of 0 is assigned.

In some embodiments, when a chemical detection result in the soil is acquired, a plurality of measurement points distributed in a grid pattern may be set in the target area, and chemical detection is performed on soil at each measurement point, respectively. In some embodiments, as described above, the scale of the grid map layers may be 200 m*200 m, i.e., a grid represents a parcel of 200 m*200 m. When measurement points are set, a scale different from that of the grid map layers may be used. For example, measurement points may be set in a grid scale of 200 m*1 km, thereby greatly reducing the number of measurement points that need to be set, which may improve detection efficiency and save costs. In some embodiments, the measurement points may also be set using the same scale as the grid map layers 20, so that detection results of each measurement point may be in one-to-one correspondence with the grids 21.

In some embodiments, since the scale used for setting the measurement points is not the same as the scale of the grid map layers 20, i.e., the chemical detection results acquired at the measurement points are not in one-to-one correspondence with the grids 21. In order to ensure accuracy of the data used for assigning values to the grids 21, the following method may be used: according to a chemical detection result of each measurement point, interpolation is performed using Kriging interpolation method to respectively acquire a first grid map layer and a second grid map layer, where the first grid map layer and the second grid map layer have different scales, and one of the first grid map layer and the second grid map layer has the same scale as the grid map layers 20, and then a value may be assigned to the grid 21 in the grid map layers 20 according to a ratio of values of corresponding grids in the first grid map layer and the second grid map layer.

The Kriging method is a regression algorithm that preforming spatial modeling and prediction (interpolation) to a random process/random field according to a covariance function. In a specific random process, such as an inherently stationary process, the Kriging method may provide an optimal linear unbiased estimate, and thus it is also called a spatially optimal unbiased estimator in geostatistics. Interpolation using the Kriging method may combine the data of all measurement points to perform interpolation on the first grid map layer and the second grid map layer. For the specific interpolation method, please refer to the general method of Kriging interpolation well-known in the art, which will not be described in detail here.

Although the Kriging method can directly interpolate the chemical detection result to generate a grid map layer 20 with a scale of 200 m*200 m, there may still be a possibility of an error in the interpolation result. In the embodiments of the present disclosure, the first grid map layer and the second grid map layer are first acquired by using the Kriging method. Taking the first grid map layer having a scale of 200 m*200 m and the second grid map layer having a scale of 10 km*10 km as an example, since the second map layer has the relatively large scale, one grid in the second grid map layer may correspond to 250 grids in the first grid map layer. In addition, grids in the first grid map layer are in a one-to-one correspondence with the grids 21 in the grid map layers 20. During the value assignment, taking a grid in the first grid map layer as an example, a ratio $Rn3$ between a value $Rn1$ of this grid and a value $Rn2$ of a grid corresponding to this grid in the second grid map layer is calculated, i.e., $Rn3=Rn1/Rn2$. After this, if $Rn3$ is greater than 1, a value of 1 is assigned to a grid in the grid map layers 20 corresponding to this grid, and if $Rn3$ is smaller than or equal to 1, a value of 0 is assigned. Therefore, interference of errors in the interpolation process of the Kriging method is avoided.

All value assignment processes of the chemical detection results described below may be realized by the above method, and related parts will not be described in detail in the following text.

In some embodiments, as described above, since the chemical detection result may include the measurement result of soil radon gas, the soil element mobile form measurement result and the measurement result of geogas, values may be assigned to the grids 21 in the grid map layers 20 respectively according to the measurement result of soil radon gas, the measurement result of mobile forms of soil element, and the measurement result of geogas.

In some embodiments, during value assignment according to the measurement result of mobile forms of soil elements, contents of Th, Mo, Se, Re and V of mobile forms, a uranium content, and correlation coefficients between the contents of Th, Mo, Se, Re and V of mobile forms, and the uranium content may be acquired first according to the measurement result of mobile forms of soil elements, so as to determine first mobile form uranium amount data of the soil; and values may be assigned to the grids 21 in the grid map layers 20 according to the first mobile form uranium amount data.

Specifically, the contents $CTh$, $CMo$, $CSe$, $CRe$ and $CV$ of Th, Mo, Se, Re and V of mobile forms, the uranium content $CU$, and the correlation coefficients $RTh$, $RMo$, $RSe$, $RRe$ and $RV$ between these elements and the uranium content $CU$ may be acquired according to the measurement result of mobile forms of elements, and then a first mobile form uranium amount MU of each measurement point is acquired. The applicable formula is: $MU=CU+CTh \times RTh+CMo \times RMo+CSe \times RSe+Cre \times RRe+CV \times RV$. After the above steps are completed, the above Kriging interpolation and value assignment to the grid map layers may be performed according to the first mobile form uranium amount of each measurement point.

In some embodiments, during value assignment to the grids 21 in the grid map layers 20 according to the measurement result of geogas, contents of Th, Mo, Se, Re and V in the geogas, the uranium content, and correlation coefficients between the contents of Th, Mo, Se, Re and V in the geogas and the uranium content may be acquired according to the measurement result of geogas, so as to determine second mobile form uranium amount data of the soil; and values may be assigned to the grids 21 in the grid map layers 20 according to the second mobile form uranium amount data.

Specifically, the contents CGTh, CGMo, CGSe, CGRe and CGV of Th, Mo, Se, Re and V in the geogas, the uranium content CGU, and correlatio coefficients rGTh, rGMo, rGSe, rGRe and rGV between each of the above contents in the geogas and the uranium content may be acquired according to the measurement result of geogas, and then a second mobile form uranium amount MGU of each measurement point is acquired. The applicable formula is: $MGU=CGU+CGTh \times rGTh+CGMo \times rGMo+CGSe \times rGSe+CGRe \times rGRe+CGV \times rGV$. After the above steps are completed, the above Kriging interpolation and value assignment to the grid map layers may be performed according to the second mobile form uranium amount of each measurement point.

Specific methods of delineating the plurality of exploration regions in the combined map layer 30 and providing boreholes in the plurality of exploration regions are described below.

In some embodiments, when the plurality of exploration regions are delineated according to the values in the combined map layer 30, an average of the values of respective grids 31 in the combined map layer 30 may be calculated first, and then a plurality of candidate regions are determined, where each candidate region is formed by connecting a plurality of adjacent grids 31 with values greater than the average to each other. Then, a greatest value of the values of grids 31 in each of the candidate regions may be multiplied by an area of the candidate region, where the area of the candidate region may be represented by the number of the grids 31 in the candidate region, i.e., a greatest value of the values of the grids 31 in a candidate region may be multiplied by the number of the grids 31 in that candidate region, and further, the plurality of candidate regions are selected as the plurality of exploration regions according to a descending order of these multiplication results. It may be understood that a greater value of a grid 31 means more likely that there is a uranium deposit in a parcel corresponding to this grid 31. Since a uranium deposit is usually distributed continuously, if a uranium deposit indeed exists, then grids 31 in a large area surrounding this grid 31 should also have greater values; if a grid 31 has a greater value, and grids 31 surrounding this grid 31 all have smaller values, or only a small part of the grids 31 surrounding this grid 31 also have greater values, this means that errors may occur to the values here, or a distribution of a uranium deposit does exist, but due to a small range of distribution, it does not have a value of subsequent exploration and mining. On this basis, in this embodiment, screening is performed according to the above multiplication results, and exploration regions are selected in the descending order, so as to eliminate these interferences and further improve the efficiency of exploration. Those skilled in the art may select an appropriate number of exploration regions according to actual needs, which is not specifically limited here. In a preferred embodiment, 4 to 5 exploration regions may be selected for subsequent drilling and exploration.

Figure 4:
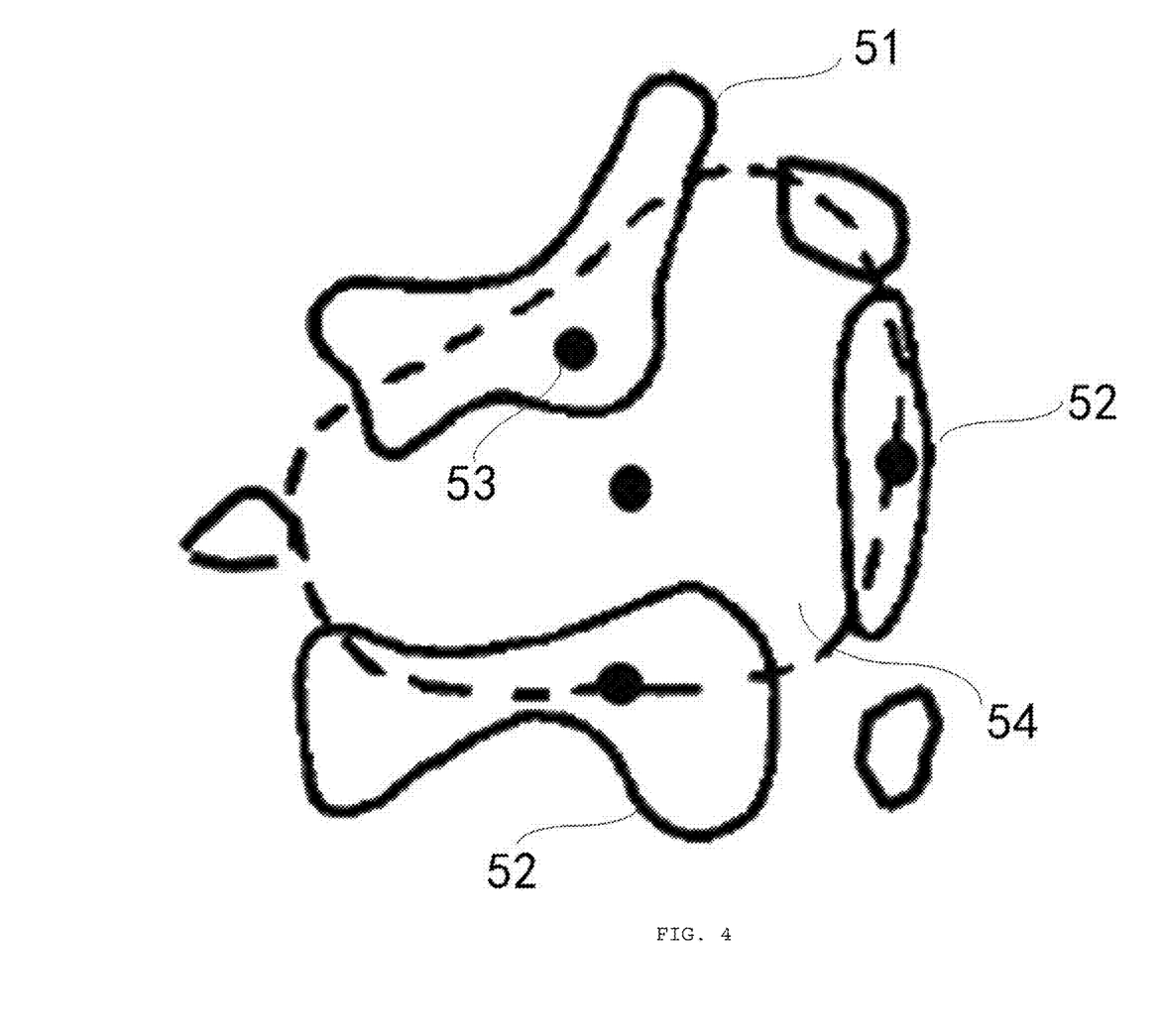
FIG. 4 shows a schematic diagram of a positional relationship between a key exploration region and exploration regions adjacent thereto according to an embodiment of the present disclosure.

In some embodiments, referring to FIG. 4, when boreholes are provided in the plurality of exploration regions for gamma detection, an exploration region with the greatest multiplication result in the plurality of exploration regions may be determined as a key exploration region 51, and boreholes 53 are provided in the key exploration region 51 and a plurality of exploration regions 52 adjacent to the key exploration region 51 for gamma detection. As shown in FIG. 4, the plurality of exploration regions 52 adjacent to the key exploration region 51 may be exploration regions 52 directly adjacent to the key exploration region 51, so as to reduce the number of boreholes 53 that need to be provided as much as possible, which may improves the exploration efficiency and saves costs.

In some embodiments, in addition to the boreholes 53 provided in the key exploration region 51 and the exploration regions 52 adjacent to the key exploration region 51, boreholes 53 may also be provided in a region 54 between the plurality of exploration regions 52. Referring to FIG. 4, the region 54 between the plurality of exploration regions 52 may refer to a region which is between the plurality of exploration regions 52 and approximate to a side of the key exploration region 51. It may be understood that the region 54 is not one of the exploration regions 52, i.e., a value of a grid in the region 54 is not relatively great, but since the region 54 is surrounded by the plurality of exploration regions 52, there is a high possibility that a boundary of the distribution of the uranium deposit or an inflection point of the trend of the uranium deposit in the region 54, according to the characteristics of continuous distribution of a uranium deposit. Therefore, further providing boreholes 53 in the region 54 may further improve the accuracy of the exploration result.

In some embodiments, only one borehole 53 may be provided in each of the above key exploration region 51, exploration regions 52 adjacent to the key exploration region 51, and region 54 between the plurality of exploration regions 52, and the borehole in each region may be provided at a position of the grid with the greatest value in the region, so that the number of boreholes to be provided may be reduced as much as possible, and reference significance of the gamma detection result in each borehole 53 may be improved.

The gamma detection result may be used to determine the distribution and the trend of the uranium deposit. Specifically, a curve of a gamma detection result at each borehole 53 may be drawn according to detection values at different depths in the borehole, and whether there is a uranium deposit distributed and the trend of the distribution of the uranium deposit are determined according to the shape of the curve and specific values on the curve. Specifically, according to the shape and the specific values of the curve of the gamma detection result, a distribution of a uranium deposit may be verified, and the boreholes 53 may be classified into non-mineral holes, abnormal holes, mineralized holes, and industrial holes, etc. Relevant criteria in the art may be referred to for the specific classification and judgment criteria, which will not be described in detail here.

Figure 5:
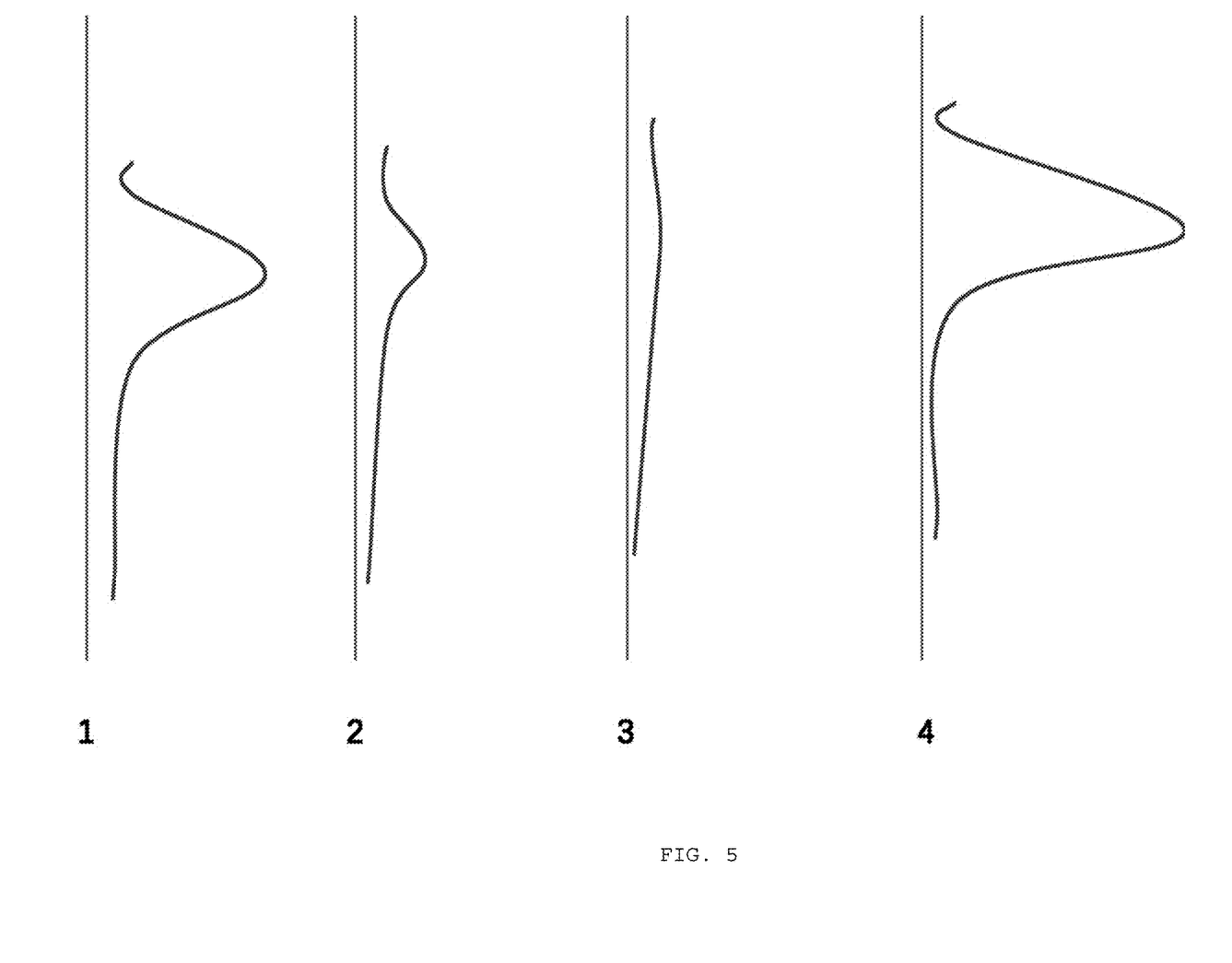
FIG. 5 shows a schematic diagram of a curve of a gamma detection result according to an embodiment of the present disclosure.

FIG. 5 shows several possible curve shapes, where the curve 1 and the curve 4 have protrusions and the peak values of the protrusions relatively great, which means that the trend of the uranium deposit at boreholes where curve 1 and curve 4 are located extends in a direction of the protrusions.

In some embodiments, one or more boreholes may be additionally provided according to the trend of the uranium deposit determined according to the gamma detection result of the above borehole 53, so as to further determine the boundary of the distribution of uranium deposit. Taking FIG. 5 as an example, one or more boreholes may be additionally provided on a side of a connection line between the boreholes corresponding to the curve 1 and the curve 4 towards extension directions of the curves in FIG. 5, so as to finally determine the boundary of the uranium deposit.

In the description of the specification, the description with reference to the terms "an embodiment", "some embodiments", "example", "specific example" or "some examples" means that the specific feature, structure, material or characteristic described in conjunction with the embodiment or example is included in at least one embodiment or example of the present disclosure. In the specification, the schematic representations of the above terms do not necessarily refer to the same embodiment or example. Moreover, the specific features, structures, materials or characteristics described may be combined in any one or more embodiments or examples in a suitable manner. In addition, those skilled in the art may combine the different embodiments or examples and the features of the different embodiments or examples described in the specification in case of no contradiction.

Although the embodiments of the present disclosure have been shown and described above, it may be understood that the above embodiments are exemplary and should not be construed as limiting the present disclosure. Those ordinary skilled in the art may make changes, modifications, replacements and transformations on the above-described embodiments within the scope of the present disclosure.

What is claimed is:

1. A method for determining a distribution of a uranium deposit, comprising:
   acquiring a remote detection result of a target area, wherein the remote detection result comprises at least one of a remote sensing detection result, an airborne radioactivity survey result, and an aeromagnetic survey result;
   acquiring a chemical detection result of soil in the target area, wherein the chemical detection result comprises at least one of a measurement result of soil radon gas, a measurement result of mobile forms of soil elements, and a measurement result of geogas;
   delineating a plurality of exploration regions in the target area according to the remote detection result and the chemical detection result; and
   providing boreholes in the plurality of exploration regions for gamma detection, and providing boreholes in non-exploration regions between the plurality of exploration regions for gamma detection, to determine a distribution of a uranium deposit and a trend of the uranium deposit according to a result of the gamma detection; wherein
   the delineating a plurality of exploration regions in the target area according to the remote detection result and the chemical detection result comprising:
   generating a plurality of grid map layers of the target area at a same scale; assigning values to grids in the grid map layers according to the remote detection result and the chemical detection result, respectively, wherein each type of detection result corresponds to one grid map layer, and when the remote detection result or the chemical detection result indicates a distribution of a uranium deposit in a grid, a relatively great value is assigned to the grid;
   adding values of corresponding grids in the plurality of grid map layers to form a combined map layer; and
   delineating the plurality of exploration regions according to values of the combined map layer, wherein the exploration regions are areas with relatively great values in the combined map layer;
   the assigning values to the grids in the grid map layers according to the chemical detection result comprises:
   assigning values to the grids in the grid map layers according to the measurement result of soil radon gas, the measurement result of mobile forms of soil elements, and the measurement result of geogas, respectively;
   assigning values to the grids in the grid map layers according to the measurement result of mobile forms of soil elements comprises: acquiring contents of chemical elements thorium (Th), molybdenum Mo, selenium (Se) rhenium (Re) and vanadium (V) of mobile forms, a uranium content, and correlation coefficients between the contents of Th, Mo, Se, Re and V of mobile forms and the uranium content according to the measurement result of mobile forms of soil elements, to determine first mobile form uranium amount data of the soil; and assigning values to the grids in the grid map layers according to the first mobile form uranium amount data;
   assigning values to the grids in the grid map layers according to the measurement result of geogas comprises:
   acquiring contents of Th, Mo, Se, Re and V in geogas, a uranium content, and correlation coefficients between the contents of Th, Mo, Se, Re and V in the geogas and the uranium content according to the measurement result of geogas, to determine second mobile form uranium amount data of the soil; and assigning values to the grids in the grid map layers according to the second mobile form uranium amount data.

2. The method for claim 1, wherein assigning values to the grids in the grid map layers according to the remote detection result comprises:
   assigning values to the grids in the grid map layers according the remote sensing detection result, the airborne radioactivity survey result, and the aeromagnetic survey result, respectively.

3. The method for claim 2, wherein assigning values to the grids in the grid map layers according to the remote sensing detection result comprises:
   determining abnormal hydroxyl data and/or abnormal iron staining data in the target area according to the remote sensing detection result; and
   assigning values to the grids in the grid map layers according to the abnormal hydroxyl data and the abnormal iron staining data, respectively, wherein a grid with abnormal hydroxyl is assigned a value of 1, a grid with non-abnormal hydroxyl is assigned a value of 0, a grid with abnormal iron staining is assigned a value of 1, and a grid with non-abnormal iron staining is assigned a value of 0.

4. The method for claim 3, wherein assigning values to the grids in the grid map layers according to the airborne radioactivity survey result comprises:

determining at least one of uranium content data, uranium-thorium ratios, uranium-potassium ratios, and uranium variation coefficients according to the airborne radioactivity survey result; and assigning values to the grids in the grid map layers according to the uranium content data, the uranium-thorium ratios, the uranium-potassium ratios, and the uranium variable coefficients, respectively, wherein abnormal thresholds corresponding to the uranium content data, the uranium-thorium ratios, the uranium-potassium ratios, and the uranium variation coefficients are respectively determined, a grid with uranium content data, a uranium-thorium ratio, a uranium-potassium ratio, and a uranium variable coefficient greater than corresponding abnormal thresholds is assigned a value of 1, and a grid with uranium content data, a uranium-thorium ratio, a uranium-potassium ratio, and a uranium variable coefficient smaller than the corresponding abnormal thresholds is assigned a value of 0.

5. The method for claim 2, wherein assigning values to the grids in the grid map layers according to the aeromagnetic survey result comprises:

acquiring aeromagnetic reduction-to-pole data according to the aeromagnetic survey result; and assigning a grid with an aeromagnetic reduction-to-pole value greater than or equal to $-100$ nT and smaller than or equal to 100 nT to 1, and assigning a grid with an aeromagnetic reduction-to-pole value smaller than $-100$ nT or greater than 100 nT to 0.

6. The method for claim 1, wherein the acquiring a chemical detection result of soil in the target area comprises:

setting a plurality of measurement points distributed in a grid pattern in the target area, and performing chemical detection on soil at each measurement point, respectively, to acquire the chemical detection result of the soil in the target area.

7. The method for claim 6, wherein when the plurality of measurement points distributed in the grid pattern are set in the target area, a scale different from a scale of the grid map layers is used to set the measurement points.

8. The method for claim 7, wherein assigning values to the grids in the grid map layers according to the chemical detection result comprises:

acquiring a first grid map layer and a second grid map layer using Kriging interpolation method according to the chemical detection result, respectively, wherein the first grid map layer and the second grid map layer have different scales, and one of the first grid map layer and the second grid map layer has the same scale as the grid map layers; and assigning a value to a grid in the grid map layers according to a ratio of values of corresponding grids in the first grid map layer and the second grid map layer.

9. The method for claim 1, wherein the delineating the plurality of exploration regions according to values in the combined map layer comprises:

calculating an average of values of respective grids in the combined map layer;

determining a plurality of candidate regions, wherein each of the candidate regions is formed by connecting a plurality of adjacent grids with values greater than the average to each other;

multiplying an area of each of the candidate regions by a greatest value of the values of the grids in the candidate regions; and selecting the plurality of candidate regions as the plurality of exploration regions in a descending order of multiplication results.

10. The method for claim 9, wherein the providing boreholes in the plurality of exploration regions for gamma detection comprises:

determining an exploration region with a greatest multiplication result in the plurality of exploration regions as a key exploration area; and providing boreholes in the key exploration region and a plurality of exploration regions adjacent to the key exploration region for gamma detection, respectively.

11. The method for claim 10, further comprising:

providing one or more boreholes in an area between the plurality of exploration regions adjacent to the key exploration region for gamma detection.

12. The method for claim 10, wherein each of the boreholes is provided at a position of a grid with a greatest value in a corresponding exploration region.

13. The method for claim 1, further comprising:

providing one or more boreholes additionally according to the trend of the uranium deposit, to determine a boundary of the distribution of the uranium deposit.

* * * * *